Nov. 29, 1966 H. W. PERRIN ETAL 3,288,654
DISPOSABLE IMMERSION-TYPE THERMOCOUPLE
Filed June 19, 1962
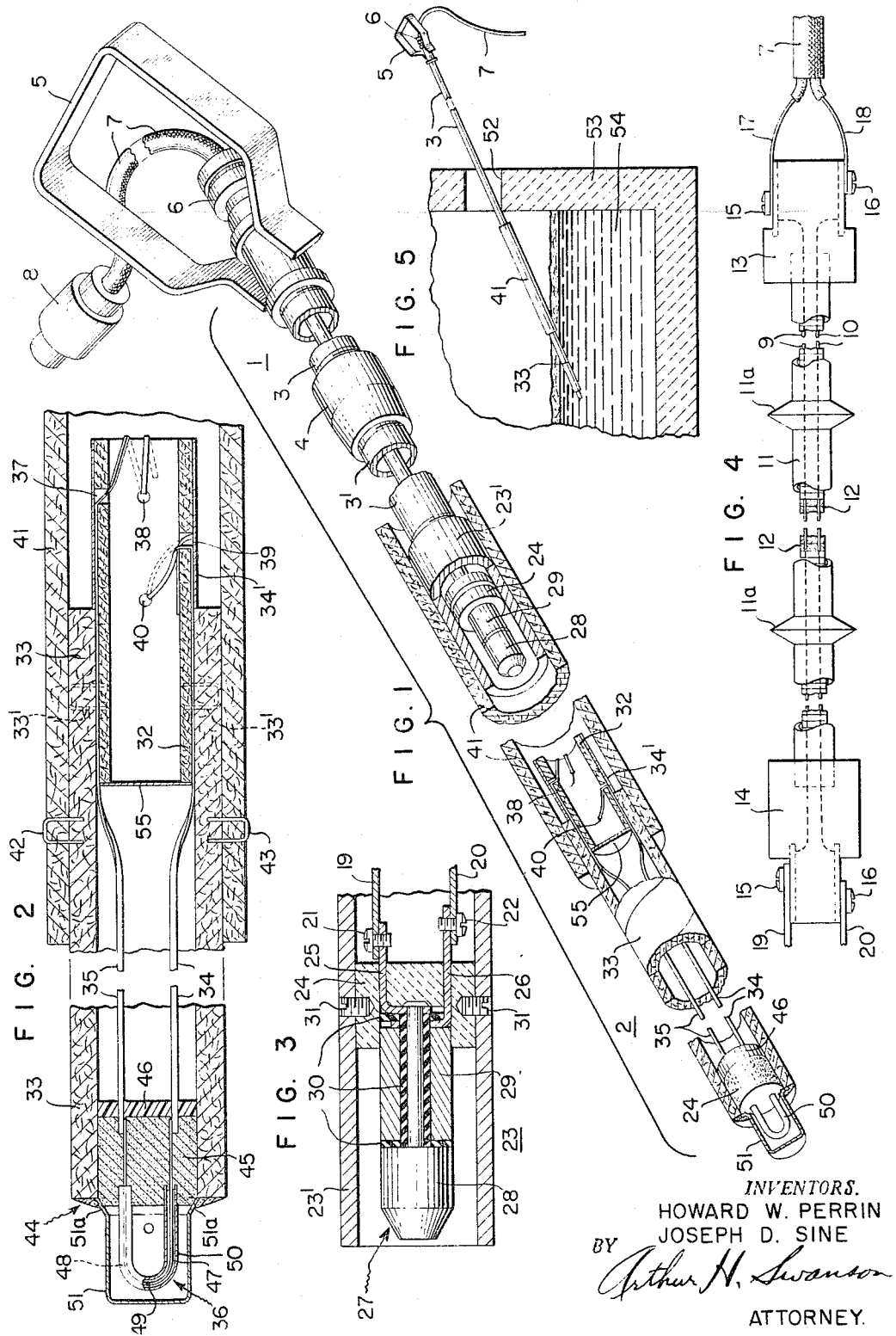
INVENTORS.
HOWARD W. PERRIN
JOSEPH D. SINE
BY Arthur H. Swanson
ATTORNEY.

United States Patent Office 3,288,654
Patented Nov. 29, 1966

3,288,654
DISPOSABLE IMMERSION-TYPE THERMOCOUPLE
Howard W. Perrin, Wilkes-Barre, and Joseph D. Sine, Sellersville, Pa.; said Sine assignor to Honeywell Inc., a corporation of Delaware
Filed June 19, 1962, Ser. No. 203,607
9 Claims. (Cl. 136—234)

A general object of the present invention is to provide an inexpensive and disposable immersion-type thermocouple for measuring the temperature of hot fluids such as molten steel.

The thermocouple of the present invention is especially adapted for use in the measurement of molten steel temperatures in open hearths, basic oxygen, or electric melting furnaces. Such temperature measurements are made by immersing the measuring or hot junction of the thermocouple in the bath of molten metal and allowing it to remain for several seconds until the thermocouple reaches the temperature of the bath. Due to the high temperature and the nature of the molten steel including the presence of slag, it has been found desirable to use a new thermocouple for each measurement. The thermocouple is discarded after the immersion and replaced by a new thermocouple in order to achieve, for each reading, new-thermocouple accuracy. Thus, for each reading, the thermocouple is new, properly annealed and uncontaminated by handling or use. This avoids errors in measurement which tend to result from changes of calibration through contamination of the thermocouple and which, in the prior art, required frequent checking for accuracy. Additionally, since the immersed parts, according to the present invention, are thrown away after each measurement, there are no skulls or slag on the thermocouple to contend with; no checking is required; and no thermocouple repair facilities are needed.

A specific object of the present invention is to provide an inexpensive, disposable immersion-type thermocouple which is light in weight, easy to handle, and affords fast, accurate and dependable temperature measurement.

A more specific object of the present invention is to provide such an immersion-type thermocouple assembly in which, after each measurement, the used thermocouple unit may be easily and quickly discarded and also easily and quickly replaced by a new thermocouple unit.

A further object of the invention is to provide an immersion-type thermocouple assembly in which a disposable thermocouple unit is supported at the end of a lance or manipulator in any angular position by a straight-through rugged connection requiring no keying.

Another object of the invention is to provide an immersion-type thermocouple assembly characterized in that immersion in the molten metal of the connector section between the thermocouple unit and lance is not required. This affords desirable protection of the lance and the connector section against the excessive heat of the molten metal.

A still further object of the present invention is to provide an immersion-type thermocouple assembly in which the lance or manipulator includes a novel evacuated inner steel tube and extension wire sub-assembly. This inner steel tube seals the extension wire assembly from the atmosphere and eliminates or substantially minimizes the tendency inherent in known prior art constructions for moisture and carbonization to short out the extension or lead wires and thus cause inaccuracy in the measurement.

Another object of the present invention is to provide an immersion-type thermocouple including a novel refractory heat sink construction for the sensitive thermocouple element.

A better understanding of the present invention may be had from the following detailed description when read in connection with the accompanying drawing in which:

FIG. 1 is an elevational view, partly sectioned, of a preferred embodiment of the disposable immersion-type thermocouple unit and lance assembly according to the present invention;

FIG. 2 is a detailed view, in section, of the thermocouple unit of FIG. 1;

FIG. 3 is a detailed view of the male connector at the end of the lance of the thermocouple assembly of FIG. 1;

FIG. 4 is a detailed view of the sealed inner tube and extension wire sub-assembly of FIG. 1;

FIG. 5 is a diagrammatic view illustrating the manner of placing the improved immersion thermocouple assembly in operative measuring position in a bath of molten metal.

The preferred embodiment of the immersion thermocouple assembly illustrated in FIG. 1 comprises a lance or manipulator section or unit 1 and a disposable, plug-in temperature sensing section or unit 2. The lance section 1 may be of any desired length for use in measuring the temperature of molten metal in a furnace. In an operative embodiment, the lance section 1 is several feet long and is made up of a ¾" stainless steel pipe section 3 and an iron pipe section 3' which are threaded at their ends and joined together by a pipe coupling member 4 which is tapered, as shown, for a purpose hereinafter described. The end of the lance 1 remote from the thermocouple unit 2 is provided with a handle or grip 5 which angularly extends to one side for facilitating the use of the assembly by an operator. Also at this end of the lance 1 is a bushing 6 through which one end of the electrical cable 7 passes. The other end of the cable 7 is provided with a suitable connector 8 for connection of the thermocouple to a suitable recorder which may be of the type disclosed in the Wills Patent 2,423,540, issued July 8, 1947, and assigned to one of the assignees of the present invention.

The electrical cable 7 is encased in suitable insulation which may be rubber or plastic in accordance with good electrical practice in the art, extending between the connector 8 and an extension wire sub-assembly, as shown in FIG. 4, and contained within the lance section 1.

Specifically, the cable 7 is connected through bushing 6 to one end of extension wires 9 and 10 which are contained within the said sub-assembly. Wires 9 and 10 are insulated from each other through the length of the lance section 1 by means of individual insulating sleeves such, for example, as two-hole, hard fired ceramic insulators 12. As shown in FIG. 4, the two-hole ceramic insulators 12 and the extension lead wires 9 and 10 supported thereby within the lance section 1, are contained in a thin wall steel tube 11 which is partially evacuated and sealed. The tube 11 is suitably supported within the stainless steel tube 3 by means of spaced rings 11a on the tube 11. The steel tube 11 is sealed at each end by epoxy connectors 13 and 14 which are molded on to the ends of tube 11 after the ceramic insulators 12 and lead wires 9 and 10 have been properly positioned therein. Screw terminals 15 and 16 are provided on each of these molded connectors 13 and 14 for connection of the lead wires 9 and 10 at one end to the cable 7 and at the other end to a male connector 23 for connection to the thermocouple unit 2. It has been found that the inner steel tube 11 and the extension or lead wire assembly eliminates or substantially minimizes moisture and carbonization effects which tend to short out the extension or lead wires. Such difficulties were common with prior art extension or lead wire assemblies. By virtue of the elimination or minimization of these problems, there has been effected a substantial reduction in maintenance and replacement costs as well as substantial improvement in accuracy and reliability.

The connection of the extension or lead wires 9 or 10 to the cable 7, through the bushing 6, is accomplished by connection of the cable wires 17 and 18 to screw terminals 15 or 16 which, in turn, are attached to the extension wires 9 and 10 through the epoxy connector 13. At the other end of the inner tube 11, the terminals 15 and 16 are connected by straight conductor bars 19 and 20 to the screw terminals 21 and 22 of the male plug connector 23, as shown in FIG. 3. Bars 19 and 20 are of different lengths to ensure connections of the proper polarity in the assemblage of the lance section.

The male connector 23, as seen in FIG. 3, comprises a molded base member 24 which is cylindrical in shape and desirably is made of an epoxy resin. Terminal members 25 and 26 to which the conductor bars 19 and 20 respectively are connected are molded in the base member 24, as is also an elongated plug member 27. The plug member 27 includes separate conducting portions 28 and 29 which are insulated from each other by suitable insulation shown at 30. An extension of portion 28 is electrically connected to the terminal member 25 of the male connector plug, and the conducting portion 29 is connected to the terminal member 26.

As shown in FIG. 3, the base member 24 and male plug 27 of the connector are mounted within a metallic housing 23' which is threaded for connection to an end of the iron pipe 3'. Member 24 and plug 27 are held in position in housing 23' by suitable set screws indicated at 31. The mounting of the male plug 27 within the end of the housing 23' provides desirable protection of the male plug member 27 against mechanical damage. Additionally, in cooperation with the associated female connector of the thermocouple unit, the plug 27 and the housing 23' provide a rugged, straight-through connection in which the required electrical connection between the thermocouple and the recording instrument is made regardless of the relative angular positions of the lance and the disposable thermocouple unit.

To that end, the female connector of the disposable thermocouple unit consists of a cylindrical tube 32 which may be made from light weight expendable material such as fiberboard or cardboard. Tube 32 is coaxially disposed within the end of a cylindrical tube 33 and is permanently and rigidly attached thereto by staples 33'. In the thermocouple unit 2, the extension or lead wires 34 and 35 from the sensitive thermocouple element 36 comprise flat ribbons of suitable cross section. These ribbons are disposed between the coaxially arranged tubes 32 and 33. The ends of the ribbons remote from the thermocouple element 36 are arranged at the end of the tube 32 remote from the thermocouple to provide electrical terminals for connection by way of the male plug member 27 and the extension or lead wires 9 and 10 to the recording instrument. Specifically, the ribbon lead wire 34 is wrapped around the end of the tube 32, as shown, being threaded through holes 37 and 38 which are displaced substantially 90° apart. This provides a terminal for ribbon 34 at the end of tube 32 which embraces substantially a 90° sector. Similarly, the ribbon 35 may be wrapped around a portion of tube 32 spaced inwardly from the end thereof, and threaded through holes 39 and 40 to provide a second terminal which also embraces substantially a 90° sector of the tube. The provision of terminals embracing a substantial portion of the inner circumference of the tube 32 assures the establishment of good electrical contact upon insertion of the male connector 27 in the end of the tube 32. The portions of ribbons 34 and 35 on the periphery of tube 32 are insulated by pressure sensitive tape 34'.

When the plug 27 is inserted in the end of the tube 32, the housing 23' fits into the annular space between the outer surface of the tube 32 and the inner surface of an outer, protective, cylindrical fibreboard tube 41. With this arrangement there is provided a strong, rigid and rugged assembly which is particularly adapted for fast and easy connection and disconnection of thermocouple unit 2 to the lance section 1. This feature is practically important in the use of the immersion thermocouple in that after a measurement has been made, the used thermocouple unit may be easily and quickly discarded, and easily and quickly replaced by a new thermocouple unit. The thermocouple unit 2 and the lance section 1 are readily mechanically and electrically connected regardless of the relative angular disposition of the sections about the longitudinal axis of the thermocouple assembly. These sections are not only readily coupled together in any angular portion, but when coupled, provide the required polarized electrical connection between the cooperating parts. Being deformable, the tube 32 and the terminals provided by the wrap around portions of the ribbons 34 and 35 provide, in cooperation with the plug 27, a tight friction grip and desired mechanical contact and a wiping action which results in good electrical contact.

The electro-mechanical connection of the mating contacts of the plug and of the female members remains firm as long as the thermocouple section 2 and the lance section 1 remain coupled. The construction is characterized, however, as will become apparent in the further description of the improved immersion thermocouple of the present invention, in that the electro-mechanical connection may readily be broken after the desired measurement has been made and the used thermocouple discarded. This can readily be accomplished by the operator by catching the end of the outer cylindrical tube 41 on the opening or wicket hole in the furnace, as seen in FIG. 5, to disengage the thermocouple unit 2 from the male connector plug 27 and the lance section 1 as the lance is withdrawn from the furnace. Upon such disengagement the thermocouple unit 2 and tube 41 which is attached thereto fall back into the furnace and are discarded. There is no need, as is the case with prior art constructions, to wait until the lance has cooled before removing and discarding the used thermocouple unit; nor is there any need for the operator actually to touch the discarded thermocouple which at such time includes charred and slag covered portions which are dirty and difficult to handle.

A further advantage inherent in the connector arrangement provided between the thermocouple unit 2 and the lance section 1 is that the resilience or flexibility for the electrical connectors is in the disposable thermocouple unit 2. Making the resilient or flexible portion of the connection, provided by the flexibility of the fiberboard tube 32 and the wrap-around ribbons 34 and 35, an integral part of the disposable thermocouple unit 2 means that a new resilient, positive-contact flexible connection is available for each reading.

The outer cylindrical tube 41 desirably also is made from light weight expendable material such as fiberboard or cardboard and is coaxially disposed around the fiberboard tube 33 of the thermocouple unit 2. As illustrated in FIG. 2, tubes 41 and 33 are permanently and rigidly attached to each other by staples 42 and 43. At its other end the tube 41 is arranged to slide over the tapered coupling 4 as shown in FIG. 1. This arrangement serves completely to shield the iron pipe 3' and provides a rigid thermocouple unit and lance assembly which is light in weight and is easily handled by an operator. At the same time the assembly is rigid and strong and has no tendency to whip around in the furnace chamber. This notwithstanding that the thermocouple assembly is very long in relation to its thickness or diameter. Additionally, tube 41 provides desirable protection for the electro-mechanical connection between the thermocouple unit and the lance section, and for the thermocouple extension or lead wires.

In the embodiment of the invention illustrated, the lance section is connected to the thermocouple unit at a distance approximately 22" from the hot junction of the sensitive thermocouple 36. Consequently, the connector section, including the plug 27 and the associated female terminals, do not enter the molten metal in most applications. This provides desirable protection for the male plug connector 27, for the extension wire sub-assembly and for the lance. An additional and important advantage of this construction is a desirable reduction in the weight of the thermocouple assembly which is permitted because of the shorter lance section required. The lance assembly includes metallic pipe sections which are relatively heavy and therefore, the reduction in the length of the lance makes possible an assembly which is much lighter in weight than is found in the prior art.

The temperature sensing section 44 of the thermocouple unit 2, as seen in FIG. 2, includes an electrically nonconducting or insulating body 45 which may be formed from any suitable insulating material or ceramic such as Sauereisen cement, and a backing cylindrical disc 46 which may be made of a suitable plastic, for example, polystyrene. In the construction of the sensitive thermocouple element 44, the ribbons 34 and 35 are molded in the plastic disc 46 and are connected to the respective ends of thermocouple elements 47 and 48. A substantial portion of the lengths of elements 47 and 48 are in close thermal contact with the body 45 in which they are embedded. The thermocouple elements 47 and 48 are joined together at their opposite ends to form a heat responsive or measuring junction indicated at 49. In one form of the invention, the thermocouple elements 47 and 48 are composed respectively of platinum and platinum rhodium. Other known thermocouple materials may be employed, as desired. In order to provide a desirably high degree of accuracy in the thermocouple measurement, the electrical conductors between the sensitive thermocouple elements 47 and 48 are made of so-called compensating materials. Specifically, copper and copper nickel, respectively, are employed for the ribbons 34 and 35, the plug members 28 and 29, the conducting bars 19 and 20, the extension wires 9 and 10, and the cable wires 17 and 18. With this extension or lead wire combination, the tendency for inaccuracies to be introduced into the thermocouple measurement because of ambient temperature changes is eliminated or substantially minimized.

In order to provide fast response and maximum sensitivity, the thermocouple elements 47 and 48 desirably are made very small in cross section, thereby reducing the mass to be heated. In the operative embodiment of the invention illustrated, the thermocouple elements 47 and 48 are made of platinum and platinum rhodium, respectively, each wire being of side .006" diameter.

In order to protect the delicate and sensitive thermocouple elements 47 and 48 from mechanical damage in the use of the immersion thermocouple, these elements 47 and 48 are enclosed within a thin-walled U-shaped sheath 50 of heat refractory, electrically non-conducting material such as silica or quartz. The use of such material or equivalent is desirable in order to provide the necessary properties of being electrically-insulating as well as heat-transmitting. Further to protect the sensitive thermocouple elements against damage in the use of the immersion thermocouple, there is provided a metal cap 51 which is rigidly secured to the body 45 of cement and forms an integral part of thermocouple unit 2. The cap 51 serves to protect the sensitive thermocouple element from mechanical injury during shipment and handling; additionally, it protects the sensitive thermocouple elements from mechanical injury or contamination due to the slag which normally is found floating on the top of the molten bath, such as molten steel. When the thermocouple is pushed through the slag, the cap 51 enters the molten bath and is fused thereby to expose the sheathed hot junction 36 of the thermocouple. In order to insure a desired permanence in the attachment of the cap 51 to the body of cement 45, the cap 51 desirably is provided with an outwardly extending flange 51a at the lip thereof, which flange is embedded in the cement 45, as shown.

The embedment of the sheath 50 and the protecting cap 51 in the body of cement 45, as well as the lapping over of the cement 45 along the end of fiberboard tube 33 as illustrated in FIG. 2, guards against the possibility of molten steel coming directly into contact with the sensitive thermocouple wires 47 and 48 or the ribbon extension wires 34 and 35. Additionally, the heavy fiberboard sleeve 33 and the thickness of the cement 45, as shown, provides desired heat insulation for the junctions of the thermocouple wires 47 and 48 and the ribbon connectors 34 and 35. By suitable selection of the cross section of the thermocouple wires 47 and 48 in relation to the thickness of the cement 45 and the dimensions of the ribbon connectors 34 and 35, there is provided at the junction of the ribbons and the thermocouple wires a heat sink which avoids undesired temperature rise at the junctions of elements 47 and 48 and associated ribbons 34 and 35 by conduction of heat lengthwise of the thermocouple elements from the hot junction 49 and from along the length of the elements 47 and 48. Additionally, the ends of the arms of the sheath 50 project only a short distance into the cement 45, as shown, to minimize the conduction of heat to said aforementioned junctions. Moreover, the close thermal contact between the elements 47 and 48 and the cement 45 in which they are embedded permits heat from the elements to be absorbed by the cement, thus further reducing the tendency for the said junctions to rise in temperature. This arrangement and proportioning of the parts provides a desired maximum sensitivity in the speed of response to the immersion thermocouple.

One way in which the immersion thermocouple of the present invention may be utilized is illustrated in FIG. 5. As there illustrated, the lance assembly is shown inserted through the opening or wicket 52 of a furnace 53 containing a bath of molten metal, for example, steel, indicated at 54. Normally in the use of the immersion thermocouple, the end of the thermocouple assembly is immersed in the molten bath to a depth less than the length of the fiberboard tube 33. This assures the immersion of the sensitive thermocouple junction to depth sufficient to get below the slag to provide a true measurement of the bath temperature while at the same time having the connection between the lance and the thermocouple unit held out of the bath and protected from the heat by the heavy fiberboard tube 41. Further protection of that connection from the heat of the furnace is provided by placing a strip of tape 55 which may be ordinary electrical insulating tape to protect the connection from heat which otherwise might be transmitted by conduction through tube 33.

After taking the temperature reading, which ordinarily requires only a few seconds, the operator can catch the end of the fiberboard tube 41 on the edge of the wicket hole 52 and make the tube 41 which is stapled to the thermocouple unit 2 fall off as he withdraws the lance from the furnace. The tube 41 and thermocouple unit 2 then fall into the furnace. A new thermocouple unit 2 may immediately be attached to the end of the lance section 1 in preparation for taking the next reading, either in the same furnace or in another one.

It will be apparent from the foregoing description that there has been provided, according to the present invention, a novel disposable, immersion-type thermocouple providing maximum sensitivity and reliability, a desirable reduction in weight of the thermocouple unit and lance section requiring no keying and at the same time providing the proper electrical connection between the thermocouple unit and the lance section, and which also eliminates or substantially minimizes the tendency to undesirable short circuits from moisture condensation or carbonization in the extension or lead wire sub-assembly from the thermocouple unit to the recording instrument.

What is claimed is:

1. A disposable temperature sensing device for measuring the temperature of molten fluid comprising a U-shaped, refractory electrically non-conductive sheath, a thermocouple comprising a pair of wires of dissimilar metals joined together in said sheath to form a hot junction, a fiberboard tube for supporting the thermocouple with the sheathed hot junction projecting beyond the end of the tube so as to be contacted by the molten fluid when immersed therein, a cylindrical disc positioned transversely of said tube near the end thereof from which said thermocouple hot junction projects, electrical connectors molded in said disc and extending through said tube for connection of said thermocouple to a measuring instrument, a refractory, electrically non-conductive body filling the space between said disc and the said end of said tube with the ends of said sheath embedded in and extending part way only into said body and with a portion of said thermocouple wires and the junction of said thermocouple wires and said electrical conductors embedded in said body in close thermal contact therewith, whereby said body seals the end of said tube and serves also as a heat sink for the portions of said thermocouple embedded in said body, a second fiberboard tube, the outer diameter of said second tube being approximately equal to the inner diameter of said first-mentioned tube, said second tube being inserted in and permanently attached to the end of said first tube immersing said thermocouple with said conductor wires fitting between said tubes and the ends of said wires wrapped about said second tube to provide longitudinally displaced terminals for said conductors on the inner surface of said second tube.

2. A disposable temperature sensing device as specified in claim 1 including a barrier at the end of said second tube facing said thermocouple to reduce the conduction of heat through said first tube to said terminals.

3. A disposable temperature sensing device as specified in claim 1 including a third fibreboard tube, the inner diameter of said third tube being approximately equal to the outer diameter of said first mentioned tube, with the end of said first tube remote from said thermocouple being inserted in and permanently attached to said third tube.

4. An immersion thermocouple assembly including the combination of a disposable temperature sensing device as specified in claim 1 and a manipulator for supporting and for connecting said sensing device to a measuring instrument including a metal pipe, a coaxially disposed cylindrical plug member mounted at one end of said pipe and having separate longitudinally spaced electrical contacts for mating with the terminals on said second tube, the diameter of said plug being approximately equal to the inner diameter of said second tube and the longitudinal spacing of said contacts being approximately equal to the longitudinal spacing of the terminals on the inner surface of said second tube.

5. An immersion thermocouple assembly as specified in claim 4 including a third fibreboard tube, the inner diameter of said third tube being approximately equal to the outer diameter of said first mentioned tube, with the inner end of said first tube remote from said thermocouple being inserted in and permanently attached to one end of said third tube, and a metallic housing coaxially arranged about said plug member whereby a cylindrical section of said housing fits into the annular space between said second and third tubes to provide a rigid assembly when said disposable temperature sensing device is brought into operative relationship with said manipulator with the contacts on said plug in mating engagement with the terminals on said third tube.

6. An immersion thermocouple assembly as specified in claim 5 in which the inner surface of the other end of said third tube frictionally engages a tapered projection on said manipulator when the latter and said disposable temperature sensing device are brought into operative relationship whereby said third tube then is operative to serve as a shield for a portion of said manipulator and to add a desirable rigidity and strength to the thermocouple assembly.

7. An immersion thermocouple assembly as specified in claim 4 in which said manipulator includes a handle, mounted at the other end of said pipe, terminals for said thermocouple adjacent said handle, and an evacuated extension wire sub-assembly supported within said pipe for electrically connecting the contacts on said plug to said terminals adjacent said handle.

8. An immersion thermocouple assembly as specified in claim 7 including a two-wire cable adapted for connection at one end to a measuring instrument and at the other end to said terminals adjacent said handle.

9. An immersion thermocouple assembly as specified in claim 7 in which said evacuated extension wire sub-assembly comprises a metallic tube, molded plastic terminal connectors providing a seal at each end of said metallic tube, a pair of terminals on each of said connectors, a pair of extension wires extending through said metallic tube with each wire connected at its opposite ends to a respectively associated terminal on said connectors, and ceramic insulators arranged in said metallic tube to support said extension wires in spaced insulating relation from each other and from the inner wall of said metallic tube.

References Cited by the Examiner
UNITED STATES PATENTS

| 2,972,125 | 2/1961 | Temple et al. | 339—183 X |
| 2,993,944 | 7/1961 | Silver | 136—4.7 |
| 3,024,295 | 3/1962 | Moore | 136—4.7 |
| 3,038,951 | 6/1962 | Mead | 136—4.7 |
| 3,048,642 | 8/1962 | Parker | 136—4.7 |
| 3,169,401 | 2/1965 | Newman | 73—359 |

WINSTON A. DOUGLAS, *Primary Examiner.*

ISAAC LISANN, *Examiner.*

S. H. BAZERMAN, A. M. BEKELMAN,
*Assistant Examiners.*